United States Patent [19]

Sugiyama

[11] Patent Number: 5,855,532

[45] Date of Patent: Jan. 5, 1999

[54] METHOD AND SYSTEM FOR CONTROLLING AUTOMATIC TRANSMISSION

[75] Inventor: Hideharu Sugiyama, Fuji, Japan

[73] Assignee: Jatco Corporation, Fuji, Japan

[21] Appl. No.: 574,158

[22] Filed: Dec. 18, 1995

[30] Foreign Application Priority Data

Dec. 27, 1994 [JP] Japan .................................. 6-325804

[51] Int. Cl.$^6$ .................................................. F16H 61/12
[52] U.S. Cl. ............................ 477/97; 477/906; 477/159
[58] Field of Search ............................ 477/906, 97, 154, 477/159

[56] References Cited

U.S. PATENT DOCUMENTS

| | | | |
|---|---|---|---|
| 4,849,899 | 7/1989 | Cote et al. | 477/906 |
| 4,896,569 | 1/1990 | Ito et al. | 477/906 |
| 4,918,606 | 4/1990 | Ito et al. | 477/906 |
| 5,033,328 | 7/1991 | Shimanaka | 477/906 |
| 5,439,426 | 8/1995 | Nakashima | 477/906 |

FOREIGN PATENT DOCUMENTS

| | | |
|---|---|---|
| 0 575 094 | 12/1993 | European Pat. Off. . |
| 34 47 626 | 7/1986 | Germany . |
| 42 31 821 | 3/1994 | Germany . |
| 2-097765 | 4/1990 | Japan . |
| 0 459 274 | 12/1991 | Japan . |

*Primary Examiner*—Charles A. Marmor
*Assistant Examiner*—Sherry Lynn Estremsky
*Attorney, Agent, or Firm*—Foley & Lardner

[57] ABSTRACT

An automatic transmission control system is capable of quickly and accurately judging the normal state and faulty state of an input shaft rotation speed sensor and/or an output shaft rotation speed sensor. The system includes an input shaft rotation speed sensor condition judging device for judging whether an input shaft rotation speed sensor detecting a rotation speed $N_I$ of an input shaft of the automatic transmission is in a normal or faulty state, an output shaft rotation speed sensor condition judging device for judging whether an output shaft rotation speed sensor detecting a rotation speed $N_O$ of an output shaft of the automatic transmission is in a normal or faulty state, a multiplying means for multiplying the rotation speed $N_O$ of the output shaft with a current transmission gear ratio, and comparing and judging means for judging whether the multiplied value is coincident with the rotation speed $N_I$ of the input shaft. On the basis of those judgements, the output shaft rotation speed sensor is judged whether it is in the normal state or not by the output shaft rotation speed sensor condition judging device.

9 Claims, 2 Drawing Sheets

METHOD AND SYSTEM FOR CONTROLLING AUTOMATIC TRANSMISSION

BACKGROUND OF THE INVENTION

1. Field of the Invention

The present invention relates to a control method for an automatic transmission and a system therefor, which can judge whether a rotation speed sensor for detecting rotation speed of an input shaft and an output shaft of an automatic transmission is in normal condition or abnormal condition.

2. Description of the Related Art

In an automatic transmission, it is required to progressibly vary supply pressure for frictional engaging element newly engaging upon shifting operation. At the same time, an output torque of an engine is temporarily lowered for reducing variation of torque which can be caused upon shifting operation and thus achieving smooth shifting operation without causing shift shock. Therefore, there is generally employed a method for appropriately adjusting a supply pressure for frictional engaging element by means of a line pressure controlling valve or so forth, on the basis of detection signals detected by employing an input shaft rotation speed sensor detecting rotation speed of an input shaft of the automatic transmission and an output shaft rotation speed sensor detecting rotation speed of an output shaft of the automatic transmission.

However, when failure is caused on the input shaft rotation speed sensor or the output shaft rotation speed sensor, it becomes impossible to perform appropriate control for reducing shift shock as set forth above. Therefore, in the prior art, when failure is caused in the input shaft rotation speed sensor or the output shaft rotation speed sensor, an appropriate gear ratio is set or a supply pressure for the frictional engaging element is set in order to avoid problem in a control system. Such fail-safe control system for the automatic transmission has been proposed in Japanese Patent Application Laid-open No. 97765/1990.

A fail detection system for an automatic transmission as disclosed in Japanese Patent Application Laid-open No. 97765/1990 may detect any failure caused on the input shaft rotation speed sensor or the output shaft rotation speed sensor.

However, in such conventional systems, it is not possible to identify which of the input shaft rotation speed sensor or the output shaft rotation speed sensor is the faulty sensor. Therefore, it becomes difficult to optimally perform the fail-safe process. Therefore, the fail-safe process is inherently performed under assumption that all sensors are in faulty condition. For instance, despite of the fact that failure is caused only in the input shaft rotation speed sensor, a gear ratio of the automatic transmission is held at third speed ratio, in which the input shaft and the output shaft of the transmission are directly coupled for rotation at equal speeds, and the supply pressure (line pressure) to be supplied to the frictional engaging element which becomes engaged upon shifting is adjusted to the maximum value. Therefore, it inherently cause degradation of riding quality, and an unnecessarily long period is required for restoration from this condition.

On the other hand, since the faulty rotation speed sensor cannot be identified, it is also difficult to store the individual fault history of the rotation speed sensor.

SUMMARY OF THE INVENTION

It is an object of the present invention to provide a control method for an automatic transmission which can quickly and correctly identify normal conditions and abnormal conditions of an input shaft rotation speed sensor and an output shaft rotation speed sensor, and a system therefor.

Another object of the invention is to provide a control method for an automatic transmission which can quickly restore from fail-safe process when judgement is made that the input shaft rotation speed sensor and the output shaft rotation speed sensor are normal.

According to the first aspect of the invention, a method for controlling an automatic transmission comprises the steps of:

judging whether an input shaft rotation speed sensor for detecting rotation speed of an input shaft of the automatic transmission is in normal state or faulty state;

judging whether an output shaft rotation speed sensor for detecting rotation speed of an output shaft of the automatic transmission is in normal state or faulty state;

multiplying the rotation speed of the output shaft detected by the output shaft rotation speed sensor and a currently selected gear ratio of the automatic transmission;

comparing and judging whether a product value of the rotation speed of the output shaft detected by the output shaft rotation speed sensor and the currently selected gear ratio of the automatic transmission matches with the rotation speed of the input shaft, and the step of judging for the condition of the output shaft rotation speed sensor judging that the output shaft rotation speed sensor is in normal state on the basis of the judgement that the product value of the rotation speed of the output shaft detected by the output shaft rotation speed sensor and the currently selected gear ratio of the automatic transmission matches with the rotation speed of the input shaft, as checked at the comparing and judging step.

Here, the judgement that the output shaft rotation speed sensor is in normal state is made only when the rotation speed of the input shaft detected by the input shaft rotation speed sensor falls within a predetermined range, in the step of judging the state of the output shaft rotation speed sensor.

According to the second aspect of the invention, a method for controlling an automatic transmission comprises the steps of:

judging whether an input shaft rotation speed sensor for detecting rotation speed of an input shaft of the automatic transmission is in normal state or faulty state;

judging whether an output shaft rotation speed sensor for detecting rotation speed of an output shaft of the automatic transmission is in normal state or faulty state;

multiplying the rotation speed of the output shaft detected by the output shaft rotation speed sensor and a currently selected gear ratio of the automatic transmission;

comparing and judging whether a product value of the rotation speed of the output shaft detected by the output shaft rotation speed sensor and the currently selected gear ratio of the automatic transmission matches with the rotation speed of the input shaft, and the step of judging for the condition of the input shaft rotation speed sensor judging that the output shaft rotation speed sensor is in normal state on the basis of the judgement that the product value of the rotation speed of the output shaft detected by the output shaft rotation speed sensor and the currently selected gear ratio of the automatic transmission matches with the rotation speed of the input shaft as checked at the comparing and judging step.

According to the third aspect of the invention, a system for controlling an automatic transmission comprising:

an input shaft rotation speed sensor condition judging device judging whether an input shaft rotation speed sensor for detecting rotation speed of an input shaft of the automatic transmission is in normal state or faulty state;

an output shaft rotation speed sensor condition judging device judging whether an output shaft rotation speed sensor for detecting rotation speed of an output shaft of the automatic transmission is in normal state or faulty state;

multiplying means for multiplying the rotation speed of the output shaft detected by the output shaft rotation speed sensor and a currently selected gear ratio of the automatic transmission;

comparing and judging means for comparing and judging whether a product value of the rotation speed of the output shaft detected by the output shaft rotation speed sensor and the currently selected gear ratio of the automatic transmission matches with the rotation speed of the input shaft, and the output shaft rotation speed sensor condition judging device judging for the condition of the output shaft rotation speed sensor judging that the output shaft rotation speed sensor is in normal state on the basis of the judgement that the product value of the rotation speed of the output shaft detected by the output shaft rotation speed sensor and the currently selected gear ratio of the automatic transmission matches with the rotation speed of the input shaft as checked by the comparing and judging means.

It is preferred that the judgement that the output shaft rotation speed sensor is in normal state occur only when the rotation speed of the input shaft detected by the input shaft rotation speed sensor falls within a predetermined range, in the step of making judgement of the state of the output shaft rotation speed sensor.

According to the fourth aspect of the invention, a system for controlling an automatic transmission comprises:

input shaft rotation speed sensor condition judging means for judging whether an input shaft rotation speed sensor for detecting rotation speed of an input shaft of the automatic transmission is in normal state or faulty state;

output shaft rotation speed sensor condition judging means for judging whether an output shaft rotation speed sensor for detecting rotation speed of an output shaft of the automatic transmission is in normal state or faulty state;

multiplying means for multiplying the rotation speed of the output shaft detected by the output shaft rotation speed sensor and a currently selected gear ratio of the automatic transmission;

comparing and judging means for comparing and judging whether a product value of the rotation gear of the output shaft detected by the output shaft rotation speed sensor and the currently selected gear ratio of the automatic transmission matches with the rotation speed of the input shaft, and the input shaft rotation speed sensor condition judging means judging for the condition of the input shaft rotation speed sensor judging that the output shaft rotation speed sensor is in normal state on the basis of the judgement that the product value of the rotation speed of the output shaft detected by the output shaft rotation speed sensor and the currently selected gear ratio of the automatic transmission matches with the rotation speed of the input shaft as checked by the comparing and judging means.

According to the fifth aspect of the invention, a method for controlling an automatic transmission comprises the steps of:

judging whether an input shaft rotation speed sensor for detecting rotation speed of an input shaft of the automatic transmission is in normal state or faulty state;

judging whether an output shaft rotation speed sensor for detecting rotation speed of an output shaft of the automatic transmission is in normal state or faulty state;

switching a control mode for the automatic transmission from a normal mode, in which a transmission gear ratio is determined depending upon predetermined shifting parameters, to a fail-safe mode, in which a transmission gear ratio is fixed at a predetermined transmission gear ratio, in response to detection of faulty state in at least one of the input shaft rotation speed sensor and the output shaft rotation speed sensor;

checking whether a predetermined normal mode control resuming condition which includes at least establishment of power train for transmitting a drive torque for a final drive, responsive to termination of faulty state of the at least one of the input shaft rotation speed sensor and the output shaft rotation speed sensor, while the control mode for the automatic transmission is maintained in the fail-safe mode, and generating a normal mode resuming demand when the predetermined normal mode control resuming condition is satisfied;

resuming the normal mode of control for the automatic transmission in response to the normal mode resuming demand.

According to the sixth aspect of the invention, a system for controlling an automatic transmission comprises:

input shaft rotation sensor condition judging means for judging whether an input shaft rotation speed sensor for detecting rotation speed of an input shaft of the automatic transmission is in normal state or faulty state;

output shaft rotation sensor condition judging means for judging whether an output shaft rotation speed sensor for detecting rotation speed of an output shaft of the automatic transmission is in normal state or faulty state;

control mode switching means for switching a control mode for the automatic transmission from a normal mode, in which a transmission gear ratio is determined depending upon predetermined shifting parameters, to a fail-safe mode, in which a transmission gear ratio is fixed at a predetermined transmission gear ratio, in response to detection of faulty state in at least one of the input shaft rotation speed sensor and the output shaft rotation speed sensor;

normal mode resuming condition detecting means for checking whether a predetermined normal mode control resuming condition which includes at least establishment of power train for transmitting a drive torque for a final drive, responsive to termination of faulty state of the at least one of the input shaft rotation speed sensor and the output shaft rotation speed sensor, while the control mode for the automatic transmission is maintained in the fail-safe mode, and generating a normal mode resuming demand when the predetermined normal mode control resuming condition is satisfied; and the control mode switching means resuming the normal mode of control for the automatic transmission in response to the normal mode resuming demand.

With the present invention, the input shaft rotation speed sensor detects rotation speed of the input shaft of the automatic transmission, and, on the other hand, the output shaft rotation speed sensor detects rotation speed of the output shaft of the automatic transmission. These detection signals are output to the input shaft rotation speed sensor condition judging device and the output shaft rotation speed condition judging device.

Then, the output shaft rotation speed sensor condition judging device performs a judgement of the normality of the output shaft rotation speed sensor on the basis of the judgement of the comparing and judging means that the multiplied value of the rotation speed of the output shaft and the gear ratio of the automatic transmission and the rotation speed of the input shaft.

On the other hand, the input shaft rotation speed sensor detects rotation speed of the input shaft of the automatic transmission, and, on the other hand, the output shaft rotation speed sensor detects rotation speed of the output shaft of the automatic transmission. These detection signals are output to the input shaft rotation speed sensor condition judging device and the output shaft rotation speed condition judging device.

The input shaft rotation speed sensor condition judging device performs a judgement of the normality of the input shaft rotation speed sensor on the basis of the judgement of the comparing and judging means that the multiplied value of the rotation speed of the output shaft and the gear ratio of the automatic transmission and the rotation speed of the input shaft.

As set forth, since the output shaft rotation speed sensor condition judging device which judges whether the output shaft rotation speed sensor is in the normal condition or faulty condition, is provided, it becomes possible to discriminate whether the output shaft rotation speed sensor is in the abnormal condition. Therefore, an appropriate fail-safe process can be performed. In addition, a history of normal condition and abnormal condition can be maintained. In addition, restoring the normal control process from the fail-safe process can be done quickly and accurately, upon a judgement of normality of the output shaft rotation speed sensor.

On the other hand, since the input shaft rotation speed sensor condition judging device which makes judgement whether the input shaft rotation speed sensor is in the normal condition or faulty condition, is provided, it becomes possible to discriminate whether the input shaft rotation speed sensor is in the abnormal condition. Therefore, an appropriate fail-safe process can be performed. In addition, a history of normal condition and abnormal condition can be maintained. In addition, restoring the normal control process from the fail-safe process can be done quickly and accurately, upon a judgement of normality of the output shaft rotation speed sensor.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

One embodiment, in which a system realizing a control method for an automatic transmission is applied for a forward four speed automatic transmission with an overdrive function, will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to unnecessarily obscure the present invention.

Figure 1:
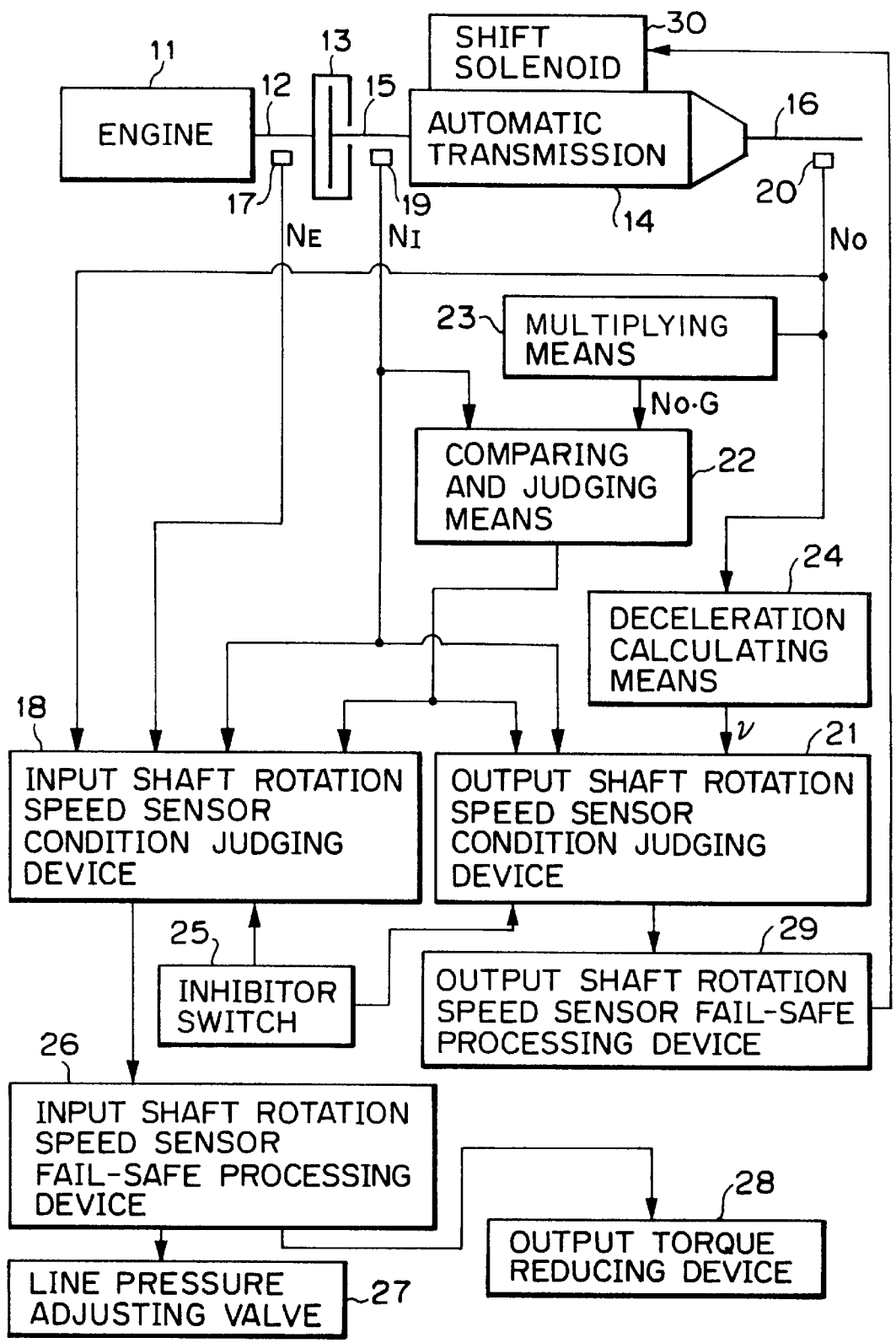
FIG. 1 is a block diagram showing a general construction of one embodiment of a control method for an automatic transmission and a system therefor, applied for a forward four speed automatic transmission with an over-drive function.
Figure 2:
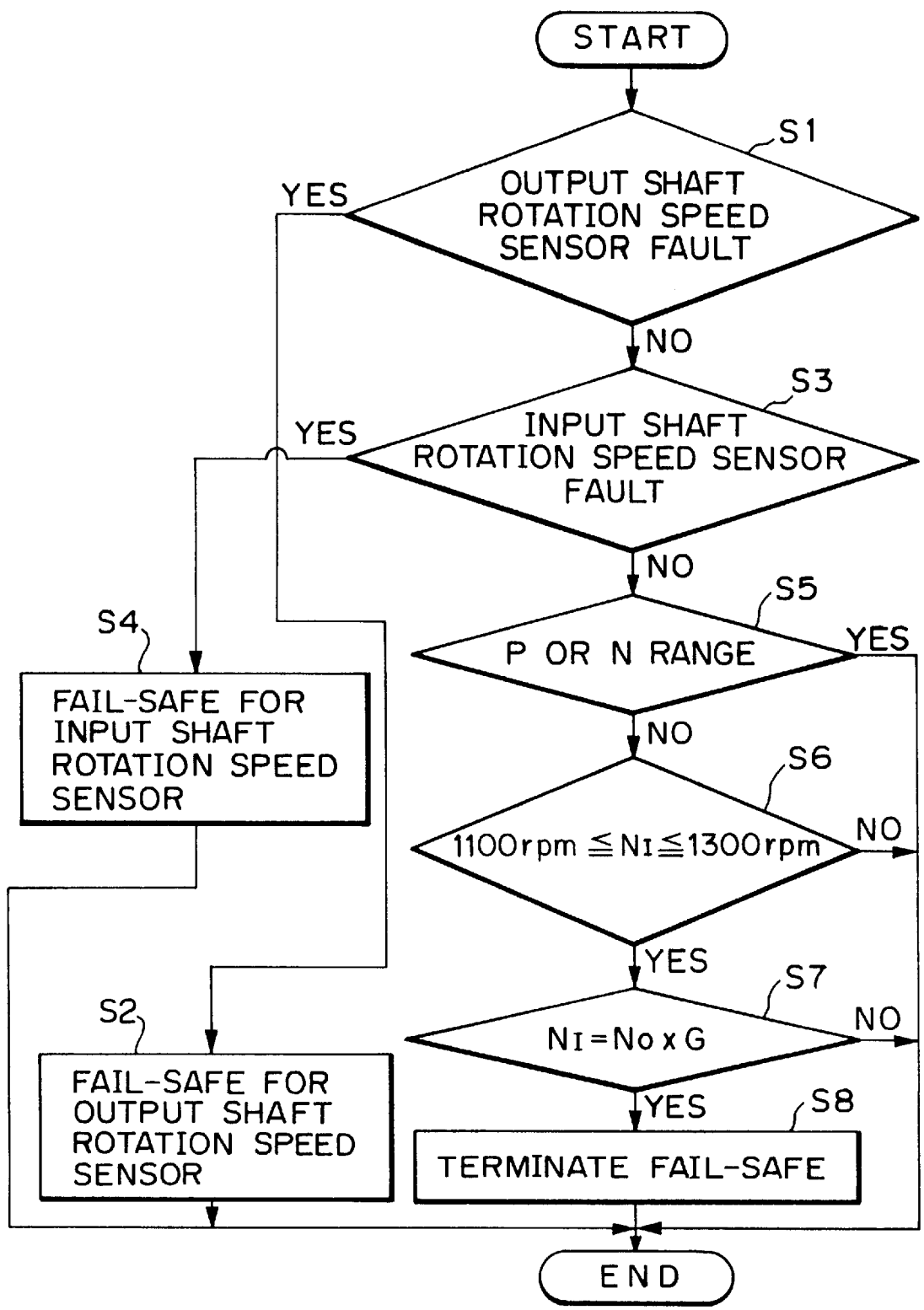
FIG. 2 is a flowchart showing a flow of the operation of the embodiment of FIG. 1.

FIG. 1 shows a concept of the control method for an automatic transmission and a system therefor, and FIG. 2 shows a flow of the process.

On a crankshaft 12 of an engine 11, an input shaft 15 of an automatic transmission 14 is connected via a torque converter 13. For an output shaft 16 of the automatic transmission, drive wheels are connected via a not shown differential gear unit.

Information relating to a rotation speed $N_E$ of a crankshaft 12 detected by an engine speed sensor 17 is adapted to be output to an input shaft rotation speed sensor condition judging device 18. To the input shaft rotation speed sensor condition judging device 18, in addition to information relating to a rotation speed $N_I$ of an input shaft 15 of an automatic transmission 14 detected by an input shaft rotation speed sensor 19, information relating to a rotation speed $N_O$ of an output shaft 16 of the automatic transmission 14 detected by an output shaft rotation speed sensor 20.

The information representative of rotation speed $N_I$ of the input shaft 15 of the automatic transmission 14 from the input shaft rotation speed sensor 19 is also output to an output shaft rotation sensor condition judging device 21 and a comparing and judging means 22.

The information relating to the rotation speed $N_O$ of the output shaft 16 of the automatic transmission 14 from the output shaft rotation speed sensor 20 is output to a multiplying means 23 and a deceleration calculating means 24. The multiplying means 23 multiplies a gear ratio G of the automatic transmission 14 and the rotation speed $N_O$ of the output shaft 16. The product thus derived by the multiplying means 23 is output to the comparing and judging means 22. The comparing and judging means 22 judges whether a product of the current gear ratio G of the automatic transmission 14 and the rotation speed $N_O$ of the output shaft 16 and the rotation speed $N_I$ of the input shaft 15 are matched or not. The result of that judgement is output to the input shaft rotation speed sensor condition judging device 18 and the output shaft rotation sensor condition judging device 21, respectively. On the other hand, the comparing judging means 22 calculates a variation rate of the rotation speed $N_O$ of the output shaft 16 and outputs to the output shaft rotation sensor condition judging device 21.

It should be noted that to the input shaft rotation speed sensor condition judgement device 18 and the output shaft rotation sensor condition judgement device 21, information from an inhibitor switch 25 detecting the position of a not shown selector lever of the automatic transmission 14 is also input.

The input shaft rotation speed sensor condition judging device 18 judges the failure of the input shaft rotation speed sensor 19 when the rotation speed $N_I$ of the input shaft 15 input by the input shaft rotation speed sensor 19 is lower than or equal to a predetermined value (e.g. lower than or equal to 600 r.p.m.) despite the fact that a rotation speed $N_E$ of the crankshaft 12 detected by the engine speed sensor 17 is higher than or equal to a predetermined value (e.g. 1500 r.p.m.) and the rotation speed No of the output shaft 16 detected by the output shaft rotation speed sensor 20 is higher than or equal to a predetermined value (e.g. 2000 r.p.m.). Then, fault information is output to an input shaft rotation speed sensor fail-safe processing device 26.

The input shaft rotation speed sensor fail-safe processing device 26 initiates a fail-safe process of the input shaft rotation speed sensor 19 on the basis of fault information from the input shaft rotation speed sensor condition judging device 18. The input shaft rotation speed sensor fail-safe processing device 26 terminates the fail-safe process for the input shaft rotation speed sensor 19 on the basis of a fail restoring information (which will be discussed later) from the input shaft rotation speed sensor condition judging device 18. In the shown embodiment, the fail-safe process of the input shaft rotation speed sensor 19 is performed to fix a supply pressure (line pressure) of a line pressure controlling valve 27 incorporated in a not shown hydraulic control circuit of the automatic transmission 14 for adjusting the supply pressure for not shown frictional engaging elements of the automatic transmission 14 for switching engaging condition upon shifting. In conjunction therewith, the fail-safe process stops actuation of the output torque lowering device 28 for temporarily lowering the output torque of the crankshaft 12 of the engine, upon shifting.

On the other hand, the output shaft rotation sensor condition judging device 21 judges the of failure of the output shaft rotation speed sensor 20 when the variation rate of the rotation speed No of the output shaft 16 derived by the deceleration calculating means 24, namely deceleration of the vehicle is greater than or equal to predetermined value B which is not possibly caused in the actual vehicle. The fault information is then output to an output shaft rotation speed sensor fail-safe processing device 29.

The output shaft rotation speed sensor fail-safe processing device 29 initiates a fail-safe process for the output shaft rotation speed sensor 20 on the basis of fault information from the output shaft rotation sensor condition judging device 21. Then, the output shaft rotation speed sensor fail-safe processing device 29 terminates the fail-safe process on the basis of a fail restoring information (which will be discussed later) from the output shaft rotation sensor condition judging device 21. In the shown embodiment, the fail-safe process for the output shaft rotation speed sensor 20 is to hold the gear ratio of the automatic transmission 14 at the third speed ratio by operating a shift solenoid incorporated in the not shown hydraulic control system.

It should be noted that when the output shaft rotation speed sensor 20 or the input shaft rotation speed sensor 19 resumes the normal state, or when a faulty sensor is replaced with a new one, it becomes necessary to terminate the fail-safe process. In this case, in the shown embodiment, when the not shown selector position information from the inhibitor switch 25 is P (parking) range or N (neutral) range, it is not possible to determine whether the input shaft rotation speed sensor 19 and the output shaft rotation speed sensor 20 are in normal condition or in faulty condition by the input shaft rotation speed sensor condition judging device 18 and the output shaft rotation sensor condition judging device 21. Therefore, at this condition, the fail-safe process for the input shaft rotation speed sensor 19 and the output shaft rotation speed sensor 20 will not be terminated.

On the other hand, when the rotation speed NI of the input shaft 15 as detected by the input shaft rotation speed sensor 19 is out of a predetermined range (e.g. 1100 r.p.m. to 1300 r.p.m. where possibility that the third speed ratio is selected, is high), termination of the fail-safe process for the input shaft rotation speed sensor 19 or the output shaft rotation speed sensor 20 should cause shifting operation other than the third speed ratio irrespective of the intention of the driver. Therefore, in such case, the input shaft rotation speed sensor condition judging device 18 and the output shaft rotation sensor condition judging device 21 will not output the information for terminating the fail-safe process for the input shaft rotation speed sensor 19 and the output shaft rotation speed sensor 20 to the input shaft rotation speed sensor fail-safe processing device 26 and the output shaft rotation speed sensor fail-safe processing device 29. In view of this, it is effective to certainly avoid a problem to cause shifting from the third speed ratio selected during fail-safe process to other gear ratio upon termination of the fail-safe process for the input shaft rotation speed sensor 19 and the output shaft rotation speed sensor 20 by combining a condition of an open angle of a not shown throttle valve with the condition of the rotation speed NI of the input shaft 15.

Furthermore, when the rotation speed NI of the input shaft rotation speed sensor 19 does not match with the product of the rotation speed No and the current gear ratio G, it is possible that the vehicle is in shifting transition by manual shifting or that some failure is caused. Therefore, in such case, the fail-safe processes for the input shaft rotation speed sensor 19 and the output shaft rotation speed sensor 20 are not terminated.

As shown in the flow of the process in FIG. 2, the output shaft rotation sensor condition judging device 21 judges whether the detection signal from the output shaft rotation speed sensor 20 is normal at a step S1. Then, if the detection signal from the output shaft rotation speed sensor 20 is not normal as checked at the step S1, the output shaft rotation speed sensor fail-safe processing device 29 initiates the fail-safe process on the basis of fault information of the output shaft rotation speed sensor 20, at a step S2.

On the other hand, when the output shaft rotation sensor condition judging device 21 judges that the detection signal from the output shaft rotation speed sensor 20 as checked at the step S1 is normal, the process is advanced to a step S3 to check whether the detection signal from the input shaft rotation speed sensor 19 is normal by the input shaft rotation speed sensor condition judging device 18. If a judgement is made that the detection signal from the input shaft rotation speed sensor 19 is not normal as checked at the step S3 by the input shaft rotation speed sensor condition judging device 18, the output shaft rotation speed sensor fail-safe processing device 29 initiates the fail-safe operation on the basis of the fault information of the input shaft rotation speed sensor 19.

When the input shaft rotation speed sensor condition judging device 18 judges that the detection signal from the input shaft rotation speed sensor condition judging device 18 is normal at the step S3, the process is advanced to a step S5 to check whether the selected position of the selector lever is in P range or N range. When the input shaft rotation speed sensor condition judging device 18 and the output shaft rotation sensor condition judgement device 21 judge that the select position of the selector lever is P range or N range, the process directly goes END. On the other hand, when a judgement is made that the select position of the selector lever is not P range or N range by the input shaft rotation speed sensor condition judging device 18 and the output shaft rotation sensor condition judging device 21 at the step S5, the process is advanced to a step S6 to perform checking whether the rotation speed NI of the input shaft 15 is within the predetermined range.

When the rotation speed Ni of the input shaft 15 as checked at the step S6 is out of the predetermined range, the process directly goes END. On the other hand, when the rotation speed Ni of the input shaft 15 is within the predetermined range, the process is advanced to a step S7 to check whether the rotation speed Ni of the input shaft 15 matches the product of the rotation speed NO of the output shaft 16 and the current gear ratio G of the automatic transmission 14.

When the input shaft rotation speed sensor condition judging device 18 and the output shaft rotation sensor condition judging device 21 judge that the rotation speed Ni of the input shaft 15 matches the product of the rotation speed No of the output shaft 16 and the current gear ratio G of the automatic transmission 14 at the step S7, the fail-safe process of the input shaft rotation speed sensor fail-safe processing device 26 and/or the output shaft rotation speed sensor fail-safe processing device 29 is terminated since the detection signals of the input shaft rotation speed sensor 19 and the output shaft rotation speed sensor 20 are in normal state at a step S8. On the other hand, when the rotation speed Ni of the input shaft 15 does not match the product of the rotation speed No of the output shaft 16 and the current gear ratio G of the automatic transmission 14 as checked at the step S7, the process directly goes END.

It should be noted that the judgement conditions for the normal state and faulty state of the input and output shaft rotation speed sensors 19 and 21 should not be specified to the shown conditions, but can be selected in various ways depending upon necessity or so forth.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A method for controlling an automatic transmission comprising the steps of:
    judging whether an output shaft rotation speed sensor for detecting a rotation speed of an output shaft of the automatic transmission is in a normal state or a faulty state;
    judging whether an input shaft rotation speed sensor for detecting a rotation speed of an input shaft of the automatic transmission is in a normal state or a faulty state;
    multiplying the rotation speed of said output shaft detected by said output shaft rotation speed sensor and a gear ratio of a currently selected gear of the automatic transmission; and
    comparing and judging whether a product value of the rotation speed of said output shaft detected by said output shaft rotation speed sensor and the gear ratio of the currently selected gear of the automatic transmission matches with the rotation speed of the input shaft;
    wherein said step of judging a condition of said output shaft rotation speed sensor judges that said output shaft rotation speed sensor is in normal state on the basis of the judgement that the product value of the rotation speed of said output shaft detected by said output shaft rotation speed sensor and the currently selected gear ratio of the automatic transmission matches with the rotation speed of the input shaft as checked at the comparing and judging step, and
    wherein said step of judging whether said output shaft rotation speed sensor is in normal state can be made only when the rotation speed of the input shaft detected by said input shaft rotation speed sensor falls within a predetermined range in said step of judging the state of said output shaft rotation speed sensor.

2. A system for controlling an automatic transmission comprising:
    an output shaft rotation speed sensor condition judging device judging whether an output shaft rotation speed sensor for detecting a rotation speed of an output shaft of the automatic transmission is in a normal or a faulty state;
    an input shaft rotation speed sensor condition judging device judging whether an input shaft rotation speed sensor for detecting a rotation speed of an input shaft of the automatic transmission is in a normal or a faulty state;
    multiplying means for multiplying the rotation speed of said output shaft detected by said output shaft rotation speed sensor and a currently selected gear ratio of the automatic transmission; and
    comparing and judging means for comparing and judging whether a product value of the rotation speed of said output shaft detected by said output rotation speed sensor and the currently selected gear ration of the automatic transmission matches with the rotation speed of the input shaft;
    wherein said output shaft rotation speed sensor condition judging device judging a condition of said output shaft rotation speed sensor judges that said output shaft rotation speed sensor is in normal state on the basis of a judgment that the product value of the rotation speed of said output shaft detected by said output shaft rotation speed sensor and the gear ratio of the currently selected gear of the automatic transmission equals the rotation speed of the input shaft as checked by the comparing and judging means, and
    wherein the judgment that the output shaft rotation speed sensor is in normal state can be made only when the rotation speed of the input shaft detected by said input shaft rotation speed sensor falls within a predetermined range in said step of judging a state of said output shaft rotation speed sensor.

3. A method for controlling an automatic transmission comprising the steps of:
    judging whether an input shaft rotation speed sensor for detecting a rotation speed of an input shaft of the automatic transmission is in a normal state or a faulty state;
    judging whether an output shaft rotation speed sensor for detecting rotation speed of an output shaft of the automatic transmission is in a normal state or a faulty state;
    switching a control mode for the automatic transmission from a normal mode, in which a transmission gear ratio is determined depending upon predetermined shifting parameters, to a fail-safe mode, in which a transmission gear ratio is fixed at a predetermined transmission gear ratio, in response to detection of a faulty state in at least one of said input shaft rotation speed sensor and said output shaft rotation speed sensor;

checking whether a predetermined normal mode control resuming condition is satisfied which includes at least establishing a power train for transmitting a drive torque for a final drive, responsive to termination of the faulty state of said at least one of said input shaft rotation speed sensor and said output shaft rotation speed sensor, while the control mode for the automatic transmission is maintained in said fail-safe mode, and generating a normal mode resuming demand when said predetermined normal mode control resuming condition is satisfied; and resuming the normal mode of control for said automatic transmission in response to said normal mode resuming demand.

4. A method as claimed in claim 3, wherein said checking step is performed by checking a position of a selector lever for detecting the selector lever at other than neutral range position and park range position for detecting establishment of said power train.

5. A method as claimed in claim 4, wherein
said step of judging a condition of said output shaft rotation speed sensor judges that said output shaft rotation speed sensor is in normal state on the basis of the judgement that the product value of the rotation speed of said output shaft detected by said output shaft rotation speed sensor and the gear ratio of the currently selected gear of the automatic transmission matches with the rotation speed of the input shaft.

6. A method as claimed in claim 4, wherein said step of judging a condition of said input shaft rotation speed sensor judges that said input shaft rotation speed sensor is in normal state on the basis of the judgement that the product value of the output rotation speed sensor and the gear ratio of the currently selected gear of the automatic transmission matches with the rotation speed of the input shaft.

7. A system for controlling an automatic transmission comprising:
input shaft rotation sensor condition judging means for judging whether an input shaft rotation speed sensor for detecting a rotation speed of an input shaft of the automatic transmission is in a normal state or a faulty state;

output shaft rotation speed sensor condition judging means for judging whether an output shaft rotation speed sensor for detecting rotation speed of an output shaft of the automatic transmission is in a normal state or a faulty state;

control mode switching means for switching a control mode for the automatic transmission from a normal mode, in which a transmission gear ratio is determined depending upon predetermined shifting parameters, to a fail-safe mode, in which a transmission gear ratio is fixed at a predetermined transmission gear ratio, in response to a detection of a faulty state in at least one of said input shaft rotation speed sensor and said output shaft rotation speed sensor; and normal mode resuming condition detection means for checking whether a predetermined normal mode control resuming condition is satisfied, which includes at least establishing a power train for transmitting a drive torque for a final drive responsive to termination of the faulty state of said at least one of said input shaft rotation speed sensor and said output shaft rotations speed sensor, while the control mode for the automatic transmission is maintained in said fail-safe mode, and generating a normal mode resuming demand when said predetermined normal mode control resuming condition is satisfied, wherein said control mode switching means resumes the normal mode of control for said automatic transmission in response to said normal mode resuming demand.

8. A method for controlling an automatic transmission comprising the steps of:
judging whether an output shaft rotation speed sensor for detecting a rotation speed of an output shaft of the automatic transmission is in a normal state or a faulty state;

judging whether an input shaft rotation speed sensor for detecting a rotation speed of an input shaft of the automatic transmission is in a normal state or a faulty state;

multiplying the rotation speed of said output shaft rotation speed sensor and a gear ratio of a currently selected gear of the automatic transmission; and comparing and judging whether a product value of the rotation speed of said output shaft detected by said output shaft rotation speed sensor and the gear ratio of the currently selected gear of the automatic transmission matches with the rotation speed of the input shaft; and wherein in said step of judging a condition of said input shaft rotation speed sensor, an input shaft rotation speed sensor condition judging device judges that said input shaft rotation speed sensor is in a normal state on the basis that the product value of the rotation speed of said output shaft detected by said output shaft rotation speed sensor and the gear ratio of the currently selected gear of the automatic transmission is equal to the rotation speed of the input shaft as checked at the comparing and judging step, and said step of judging the condition of said input shaft rotation speed sensor judges that said input shaft rotation speed sensor is in a faulty state when the rotation speed of said input shaft rotation speed sensor is lower than a predetermined input shaft rotation speed while a rotation speed of an engine speed sensor is at least a predetermined engine rotation speed and the rotation speed of the output shaft rotation speed sensor is at least a predetermined output shaft rotation speed.

9. A system for controlling an automatic transmission comprising:
input shaft rotation speed sensor condition judging means for judging whether an input rotation shaft speed sensor for detecting a rotation speed of an input shaft of the automatic transmission is in a normal state or a faulty state;

output rotation speed sensor condition judging means for judging whether an output shaft rotation speed sensor for detecting a rotation speed of an output shaft of the automatic transmission is in a normal state or a faulty state;

multiplying means for multiplying the rotation speed of said output shaft detected by said output shaft rotation speed sensor and a gear ratio of a currently selected gear of the automatic transmission; and comparing and judging means for comparing and judging whether a product value of the rotation speed of said output shaft detected by said output shaft rotation speed sensor and the gear ratio of the currently selected gear of the automatic transmission matches with the rotation speed of the input shaft;

wherein said input shaft rotation speed sensor condition judging means judging a condition of said input shaft rotation speed sensor judges that said input shaft rotation speed sensor is in normal state on the basis of judgment that the product value of the rotation speed of said output shaft detected by said output shaft rotation speed sensor and the gear ratio of the currently selected gear of the automatic transmission is equal to the rotation speed of the input shaft as checked by the comparing and judging means, and judges that said input shaft rotation speed sensor is in a faulty state when the rotation speed of said input shaft rotation speed sensor is lower than a predetermined input shaft rotation speed while a rotation speed of an engine speed sensor is at least a predetermined engine rotation speed and the rotation speed of said output shaft rotation speed sensor is at least a predetermined output shaft rotation speed.

\* \* \* \* \*